UNITED STATES PATENT OFFICE.

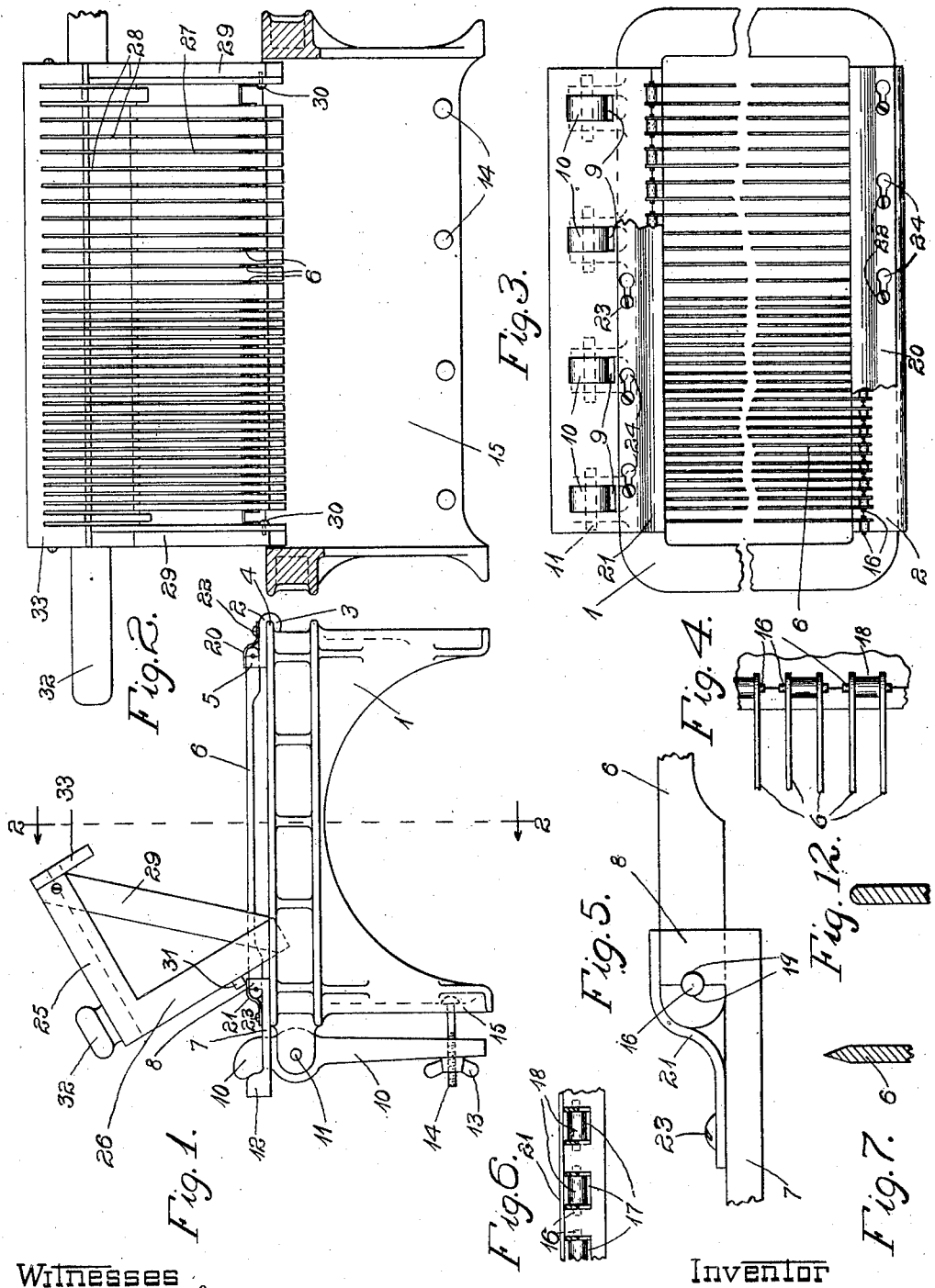
O. L. JOHNSON.
VEGETABLE AND FRUIT SLICING MACHINE.
APPLICATION FILED AUG. 5, 1909.
964,915.
Patented July 19, 1910.
2 SHEETS—SHEET 1.
Witnesses
George E. Higham
A. A. Thomas
Inventor
Oscar L. Johnson
By Brown & Williams
Attorneys O. L. JOHNSON.
VEGETABLE AND FRUIT SLICING MACHINE.
APPLICATION FILED AUG. 5, 1909.
964,915.
Patented July 19, 1910.
2 SHEETS—SHEET 2.
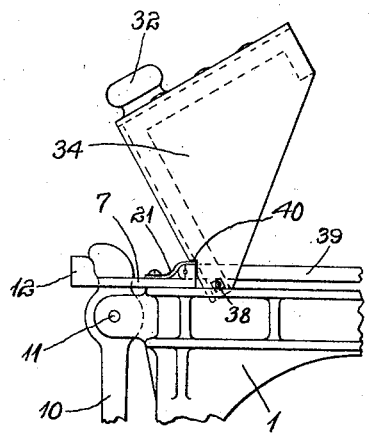
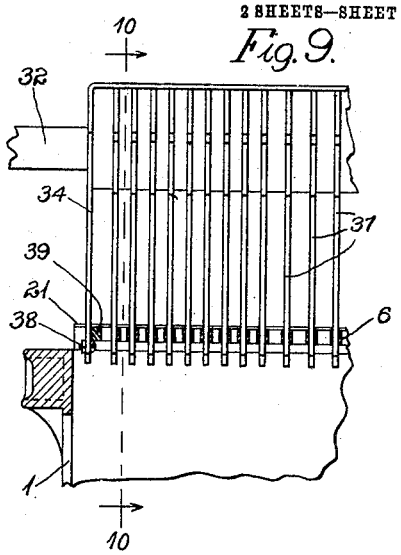
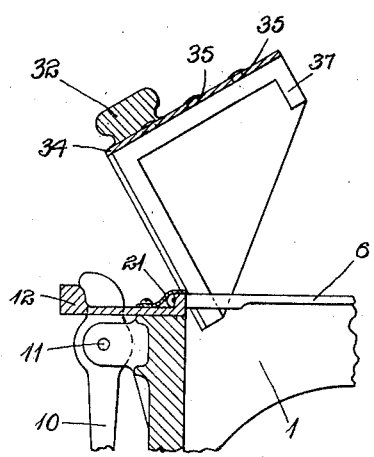
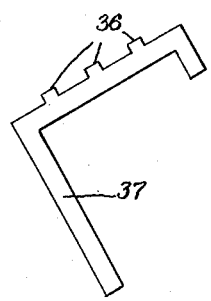
Witnesses
George E. Higham.
A. A. Thomas
Inventor
Oscar L. Johnson
By Brown William
Attorneys

OSCAR L. JOHNSON, OF CHICAGO, ILLINOIS, ASSIGNOR OF ONE-HALF TO MARY E. GRAY, OF EVANSTON, ILLINOIS.

VEGETABLE AND FRUIT SLICING MACHINE.

964,915.  Specification of Letters Patent.  Patented July 19, 1910.

Application filed August 5, 1909.  Serial No. 511,472.

*To all whom it may concern:*

Be it known that I, OSCAR L. JOHNSON, a citizen of the United States, residing at Chicago, in the county of Cook and State of Illinois, have invented a certain new and useful Improvement in Vegetable and Fruit Slicing Machines, of which the following is a full, clear, concise, and exact description, reference being had to the accompanying drawings, forming a part of this specification.

My invention relates to an improved machine for slicing fruit and vegetables, which is adapted to be readily taken apart for cleaning purposes and which accomplishes its purpose simply and directly by causing articles to be sliced to receive a shearing cut as they pass through the slicing knives.

Further objects of my invention consist in simplifying the construction of the machine and so relating the parts that they may be readily put in place or changed so that extra parts may be used.

The several drawings illustrating my invention are as follows:

Figure 1 is an end view of the machine, showing the feeding mechanism in its upper position; Fig. 2 is a sectional view taken along the line 2, 2 in Fig. 1; Fig. 3 is a top view of the machine with the feeding mechanism removed; Fig. 4 is an enlarged detail top view of one of the bars used to retain the cutting knives in position, and in this view the ends of the knives thus engaged by the bar are also shown; Fig. 5 is an enlarged detail end view of one of the bars used to retain the knives in position, and shows the manner of protecting the ends of the knives when in use; Fig. 6 shows in a view similar to Fig. 2 a portion of one of the bars used to retain the cutting knives in position, together with the knives thus engaged by the bar; Fig. 7 shows in enlarged cross-sectional view one of the cutting or slicing knives; Fig. 8 shows in a view similar to Fig. 1 a portion of the end of the machine and a modified form of feeding mechanism; Fig. 9 shows in a view similar to Fig. 2 the parts shown in Fig. 8; Fig. 10 is a vertical sectional view taken along the line 10, 10 in Fig. 9; Fig. 11 is a face view of one of the elements used to constitute the feeding mechanism shown in Figs. 8, 9 and 10. Fig. 12 is an enlarged cross-sectional view of one of the guiding strips.

My machine consists essentially of a framework 1, formed preferably of cast metal, the upper portion of which is reinforced by webs and stiffeners, as indicated. A bar 2 having a hook 3 formed along its lower right hand edge, as shown in Fig. 1, is adapted to engage the upper flange 4 extending along the right hand side of the framework, as shown in Fig. 1. The bar 2 is conformed to rest upon the top of the frame 1, and at its left hand edge this bar is extended upward, as shown at 5, to engage the slicing knives 6. The left hand ends of the slicing knives are supported by a bar or plate 7, having an upwardly extended portion or angle 8 at its right hand edge to engage such knives. The bar 7 has formed therein, as shown in Fig. 3, a plurality of openings 9, through each of which the upper end of a lever 10 pivoted to the frame 1 at 11 is adapted to project. The left hand edge of the bar 7 is reinforced, as indicated at 12, to form a bearing surface for the ends of the levers 10, which are hook-shaped, to prevent disengagement of the bar 7 therefrom when in operative relation. The lower ends of the levers 10 are engaged by thumb nuts 13 on bolts 14 extending through the side 15 of the frame 1. Holes are formed in the ends of the knives 6 to receive pins 16 adapted to retain the ends of the knives in place in the bars 2 and 7. The upturned angles 5 and 8 of these bars are slotted, as indicated in Fig. 6, at 17, such slots being of a width equal to the distance between the knives plus twice the thickness of such knives. Separators 18 are used between the ends of the knives 6 to keep them a proper distance apart, and these separators 18 may have formed upon their ends the pins 16, or the pins 16 may extend through such separators and beyond the knives a sufficient distance to engage the upturned angle portions 5 and 8 of the bars 2 and 7. These angle portions have formed therein grooves 19, as indicated in Fig. 5, to prevent the pins 16 from becoming accidentally displaced. The ends of the knives when in operative position in the grooves 17 formed in the bars 2 and 7 are protected by means of cover plates 20 and 21, secured in position by screws 22 and 23, which screws pass through slots 24 in the cover plates. The slots 24 are enlarged at their right hand ends, as shown in Fig. 3, so that the heads of the screws may pass through such enlarged portions, while their left hand ends, as shown in this figure, are of such a size as to receive only the body portion of the screws. This construction is adopted in order that the screws 22 and 23 need not be entirely removed from the bars 2 and 7 in order to remove the cover plates 20 and 21, but that by loosening the screws the cover plates may be moved slightly in their longitudinal direction, and then removed from the bars by passing the cover plates over the heads of the screws. The knives 6 are necessarily made of such a width at the ends that pins 16, of sufficient size, may pass through the knives without weakening them. This width of knife I find in practice to be greater than is desirable at that part of the knives used to slice the fruit or vegetables. I therefore reduce the width of the knives at the slicing or cutting portion, as indicated in Fig. 1. The knives are also preferably sharpened at their upper edges, as indicated in Fig. 7.

In order to pass the fruit or vegetables between the knives 6, use is made of feeding mechanism consisting in two members, 25 and 26, connected together at substantially right angles. The member 26 has a plurality of slots 27 formed through it, which slots are spaced the same distance apart as the spacing of the knives 6. This permits the feeding mechanism to be placed over the knives and provides that the member 26 may be passed entirely downward between the knives. The member 25 is similarly grooved on its under face, as indicated at 28 in Fig. 2, which permits the feeding mechanism to be moved far enough in a downward direction so that the lower face of the member 25 passes just below the lower edges of the knives 6. The outer edges of the members 25 and 26 are fastened together by braces 29, secured at their lower ends to the member 26 by means of screws 30, as indicated in Fig. 2. The heads of these screws project inward from the braces 29 a sufficient amount to extend below the end knives 6, which thus serve to retain the feeding mechanism in the machine. The engagement of the screws 30 with the end knives 6, together with the engagement of the stops 31 with the top of the bar 7, serves to maintain the feeding mechanism in its upper position indicated in Fig. 1, when such feeding mechanism is not in use. A handle 32 is secured to the upper member 25 of the feeding mechanism, by means of which such feeding mechanism may be operated. The portions of the members 25 and 26 between the two end slots at each end of such members is removed, to facilitate placing the feeding mechanism in position and removing it from the machine when desired for cleaning purposes. The member 25 carries along its forward edge a downwardly projecting member 33, slotted in a similar manner to the member 26.

In operating the machine, the article to be sliced is placed in the angle between the two members 25 and 26, and the feeding mechanism is passed downward and toward the right, as shown in Fig. 1, by means of the handle 32. The downwardly projecting member 33 serves to engage the article being sliced, if it is necessary to move the feeding mechanism to the left, as shown in Fig. 1, after the first operation in order to wholly pass the article between the knives 6. During the slicing operation, the braces 29 by their engagement with the end knives 6 serve to guide the feeding mechanism. In some cases, I find it desirable to eliminate the end slicing knives, and replace them by similar strips of metal having rounded upper edges as shown in Fig. 12, in order that the guiding action of the braces 29 against such knives may not result in cutting the braces.

In Figs. 8 to 11, inclusive, I have shown a modified form of my machine, in which the feeding mechanism consists of a main member 34 of sheet metal, bent so as to form the top and ends of the feeding mechanism. The top is perforated at intervals, as indicated at 35 in Fig. 10, to receive the rivet portions 36 formed on the upper edges of the members 37 used to engage the fruit or vegetables to be sliced. The members 37 are stamped from sheet metal and extend across the under side of the top of the member 34, in order to force the fruit or vegetables entirely through the knives 6. The members 37 extend downward at the rear of the feeding mechanism, in order to impart to it a motion longitudinal of the knives 6 when the fruit or vegetables are being passed through the knives. The members 37 project downward a short distance at their forward ends, in order to engage the fruit or vegetables and move them from the front to the rear of the machine if it is not possible to slice the same by a single continuous motion of the feeding mechanism. The main member 34 has secured thereto an operating handle 32, as before. It is to be noted in this modification that a feeding member 37 is provided for each pair of knives, and that additional feeding members are not placed between these pairs of knives. This arrangement I have found to be quite satisfactory for many purposes, and it results in a simpler and cheaper construction of feeding mechanism. The depending ends of the main member 34 carry small bolts 38 to engage the bars 39 extending between the ends of the bars 2 and 7. Each of the depending ends 34 has formed therein a notch 40 to engage the top of the cover plate 21 above the upturned flange 8 of the bar 7. The bolts 38 and notches 40 serve to retain the feeding mechanism in the position indicated in Figs. 8 and 9, when desired. In this modification, the bars 39 are of such a size as to be comparatively stiff and rigid, to afford a positive guiding action to the feeding mechanism. The bars 39 may be secured at their ends in the bars 2 and 7, as indicated for the knives 6, or, on account of their comparative stiffness, they may merely rest in the slots provided in such bars for their reception.

By the construction described above, I am able to slice fruit and vegetables very effectively, since the shearing action required may be readily secured, and further, I am able to impart to the cutting knives 6 the degree of tension required which in practice is found to be considerable, by means of the lever mechanism and the tensioning bolts 14. The locating of two knives in one groove in the upturned portion of the bars 2 and 7 is also found to be a distinct advantage in construction.

It is evident that many changes may be made in the detailed mechanism which I have described without departing from the spirit of my invention.

What I claim and desire to cover by United States Letters Patent is:

1. In a vegetable and fruit slicing machine, the combination of a main frame, bars supported by the main frame, cutting knives extending between such bars, and levers pivoted to the frame for engaging one of such bars to tighten the knives, said bars and associated knives being capable of removal from said frame when the levers are released from operative engagement.

2. In a vegetable and fruit slicing machine, the combination of a main frame, bars supported by the main frame, cutting knives extending between such bars, levers pivoted to the frame for engaging one of such bars to tighten the knives, and bolts extending from the levers to the frame for operating such levers, the disengagement of said bolts from the levers allowing the release of said levers and the removal of said bars and their associated knives from the frame.

3. In a vegetable and fruit slicing machine, the combination of a main frame, bars supported by the main frame, cutting knives extending between such bars, and a feeding member of angular cross section adapted to move articles to be sliced downward and longitudinally of the knives by the same motion.

4. In a vegetable and fruit slicing machine, the combination of a main frame, bars supported by the main frame, cutting knives extending between such bars, a frame for moving articles to be sliced between the knives with a shearing cut, and a handle carried by such frame for operating the same.

5. In a vegetable and fruit slicing machine, the combination of a main frame, bars supported by the main frame, cutting knives extending between such bars, a frame for moving articles to be sliced between the knives with a shearing cut, and means for retaining said frame in its normal raised position.

6. In a vegetable and fruit slicing machine, the combination of a main frame, bars supported by the main frame, cutting knives extending between such bars, and a frame for moving articles to be sliced between the knives with a shearing cut, such frame normally retained in operative position relatively to the knives and readily removable from the machine when desired.

7. In a vegetable and fruit slicing machine, the combination of a main frame, bars supported by the main frame, cutting knives extending between such bars, and a frame for moving articles to be sliced between the knives with a shearing cut, such frame adapted to pass the knives entirely through such articles.

8. In a vegetable and fruit slicing machine, the combination of a main frame, bars supported by the main frame, cutting knives extending between such bars, levers pivoted to the frame for removably engaging one of such bars to tighten the knives, and a frame for moving articles to be sliced between the knives with a shearing cut, such frame consisting of two members located at an angle to each other and adapted to exert respectively a down thrust and a side thrust upon such articles.

9. In a vegetable and fruit slicing machine, the combination of a main frame, bars supported by the main frame, cutting knives extending between such bars, each of such bars slotted to receive two of the knives in each slot, separators in the slots between the knives to maintain the knives in operative position, a frame for moving articles to be sliced between the knives with a shearing cut, and a handle carried by such frame for operating the same.

10. In a vegetable and fruit slicing machine, the combination of a main frame, levers pivoted to such frame, knife frames adapted to engage the main frame and the upper ends of such levers, and bolts extending from the lower ends of the levers to the main frame for tightening the knives when in operative position, the disengagement of said bolts allowing the removal of said knife and frames.

11. In a vegetable and fruit slicing machine, the combination of a main frame, levers pivoted to such frame, a first bar adapted to removably engage the upper ends of such levers, a second bar adapted to removably engage the side of the main frame opposite to such levers, and cutting knives extending between such bars and adapted to be tightened by such levers.

12. In a vegetable and fruit slicing machine, the combination of a main frame, levers pivoted to such frame, a first bar adapted to removably engage the upper ends of such levers, a second bar adapted to removably engage the side of the main frame opposite to such levers, and cutting knives extending between such bars and adapted to be tightened by such levers, such knives removably secured in pairs to such bars.

13. In a vegetable and fruit slicing machine, the combination of a main frame, levers pivoted to such frame, a first angle bar adapted to removably engage the upper ends of such levers, a second angle bar adapted to removably engage the side of the main frame opposite to such levers, and cutting knives extending between such angle bars and adapted to be tightened by such levers, such angle bars having upwardly extending slotted legs to which the ends of the knives are secured.

14. In a vegetable and fruit slicing machine, the combination of a main frame, levers pivoted to such frame, a first angle bar adapted to removably engage the upper ends of such levers, a second angle bar adapted to removably engage the side of the main frame opposite to such levers, cutting knives extending between such angle bars and adapted to be tightened by such levers, such angle bars having upwardly extending slotted legs to which the ends of the knives are secured, and removable shields for covering the ends of the knives.

15. In a vegetable and fruit slicing machine, the combination of a main frame, levers pivoted to such frame, a first angle bar adapted to removably engage the upper ends of such levers, a second angle bar adapted to removably engage the side of the main frame opposite to such levers, and cutting knives extending between such angle bars and adapted to be tightened by such levers, such angle bars having upwardly extending slotted legs to which the ends of the knives are secured, such slots being of a width slightly greater than the distance between the knives.

16. In a vegetable and fruit slicing machine, the combination of a main frame, levers pivoted to such frame, a first bar adapted to removably engage the upper ends of such levers, a second bar adapted to removably engage the side of the main frame opposite to such levers, cutting knives extending between such bars and adapted to be tightened by such levers, and a V-shaped member for engaging and passing between the knives the articles to be sliced.

17. In a vegetable and fruit slicing machine, the combination of a main frame, levers pivoted to such frame, a first angle bar adapted to removably engage the upper ends of such levers, a second angle bar adapted to removably engage the side of the main frame opposite to such levers, cutting knives extending between such angle bars and adapted to be tightened by such levers, such angle bars having upwardly extending slotted legs to which the ends of the knives are secured, removable shields for covering the ends of the knives, a frame for moving articles to be sliced between the knives with a shearing cut, such frame consisting of two members located at an angle to each other and adapted to exert respectively a down thrust and a side thrust upon such articles, and a handle carried by such frame for operating the same, such frame normally retained in operative position relatively to the knives and readily removable from the machine when desired.

18. In a vegetable and fruit slicing machine, the combination of a frame, and a plurality of substantially parallel knives secured to such frame, such knives being narrower at their cutting portions than at their ends.

19. In a vegetable and fruit slicing machine, the combination of a frame, a plurality of knives supported by the frame, and mechanism for feeding the articles to be sliced between the knives, such mechanism consisting of two members located at an angle to each other and adapted to engage the top and one side of such articles, one of such members having slots formed therein to permit it to pass downwardly between the knives.

20. In a vegetable and fruit slicing machine, the combination of a frame, a plurality of knives supported by the frame, and mechanism for feeding the articles to be sliced between the knives, such mechanism consisting of a main member and a plurality of auxiliary members secured thereto, each auxiliary member extending transversely across the under side of the main member and also downward from the main member to engage such articles in two directions.

21. In a vegetable and fruit slicing machine, the combination of a frame, a plurality of knives supported by the frame, and mechanism for feeding the articles to be sliced between the knives, such mechanism consisting of a main member and a plurality of auxiliary members secured thereto, each auxiliary member extending transversely across the under side of the main member and also downward at each of its ends from the main member to engage such articles in three directions.

22. In a vegetable and fruit slicing machine, the combination of a frame, a plurality of knives supported by the frame, and mechanism for feeding the articles to be sliced between the knives, such mechanism consisting of a main member and a plurality of auxiliary members secured thereto, each auxiliary member having two legs extending at an angle to each other, one of such legs secured to the main member and the other leg extending away from the main member.

23. In a vegetable and fruit slicing machine, the combination of a frame, a plurality of knives supported by the frame, and mechanism for feeding the articles to be sliced between the knives, such mechanism consisting of a main member formed from sheet metal and a plurality of auxiliary members stamped from sheet metal, each auxiliary member having two legs extending at an angle to each other, one of such legs secured along its outer edge transversely of the main member and the other leg extending away from the main member.

24. In a vegetable and fruit slicing machine, the combination of a frame, a plurality of knives supported by the frame, mechanism for feeding the articles to be sliced between the knives, such mechanism consisting of a main member formed from sheet metal and a plurality of auxiliary members stamped from sheet metal, each auxiliary member having two legs extending at an angle to each other, and rivet portions extending from the edge of one of such legs to engage the main member, the other leg extending in a direction away from the main member.

25. In a vegetable and fruit slicing machine, the combination of a frame, a plurality of knives supported by the frame, and mechanism for feeding the articles to be sliced between the knives, such mechanism consisting of a main member formed from sheet metal and having depending ends and auxiliary members stamped from sheet metal, the depending ends of the main member serving to retain the feeding mechanism in its upper position when desired and each of such auxiliary members consisting of two legs extending at an angle to each other, one of such legs secured to the main member and the other leg extending away from the main member.

26. In a slicing machine, the combination of a main supporting frame, a bar removably engaging said frame, a second bar resting on said frame, said second bar provided with an opening therethrough, a plurality of parallel knives supported by said bars, and a lever one end of which passes through the opening in the second bar, said lever adapted to increase the tension on said knives.

27. In a slicing machine, the combination of a main supporting frame, a bar removably engaging said frame, a second bar resting on said frame, said second bar provided with an opening therethrough, a plurality of parallel knives supported by said bars, a lever, one end of which passes through the opening in the second bar, said lever adapted to increase the tension on said knives, and a bolt for securing the other end of said lever in an adjusted position thereby retaining the required tension on said knives.

28. In a slicing machine, the combination of a main supporting frame, a bar having a hook-shaped projection engaging said frame, a second bar resting on said frame, said second bar provided with a plurality of openings therethrough, a plurality of parallel knives supported by said bars, and a plurality of levers, one end of each lever passing through an opening in the second bar, said levers adapted to regulate the tension on said knives.

29. In a slicing machine, the combination of a main supporting frame, a bar having a hook-shaped projection engaging said frame, a second bar resting on said frame, said second bar provided with a plurality of openings therethrough, a plurality of parallel knives supported by said bars, a plurality of levers, one end of each lever passing through an opening in the second bar, said levers adapted to regulate the tension on said knives, and a bolt for each lever, said bolt adapted to hold said lever in its adjusted position.

30. In a slicing machine, the combination of a main supporting frame, a bar removably engaging said frame, a second bar resting in said frame, a plurality of parallel strips extending between said bars, the two outer strips having rounded upper edges and the inner strips having sharpened upper edges to act as knives, means for holding said second bar in position, and a frame for forcing the articles to be sliced between said knives, said frame being guided by said two outer strips in its downward movement.

31. In a slicing machine, the combination of a main supporting frame, a bar removably engaging said frame, a second bar resting on said frame, said second bar provided with an opening therethrough, a plurality of parallel knives supported by said bars, a lever, one end of which passes through the opening in the second bar, said lever adapted to increase the tension on said knives, shields for covering the ends of said knives, said shields having slots, one end of each slot being enlarged, and means for retaining said shields in position, said shields adapted to be removed by loosening said retaining means, and moving said shields so that said retaining means will pass through the enlarged openings in said slots.

In witness whereof, I hereunto subscribe my name this 2nd day of August A. D. 1909.

OSCAR L. JOHNSON.

Witnesses:
ALBERT C. BELL,
HENRY C. GRAY.